US006885984B1

(12) United States Patent
Suzuki et al.

(10) Patent No.: US 6,885,984 B1
(45) Date of Patent: Apr. 26, 2005

(54) APPARATUS AND METHOD FOR AIDING PROGRAMMING

(75) Inventors: Kenji Suzuki, Aichi-ken (JP); Toshiyuki Muraki, Nagoya (JP); Makoto Tanahashi, Aichi-ken (JP); Hirokazu Yoshida, Ogaki (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/273,256

(22) Filed: Mar. 22, 1999

(30) Foreign Application Priority Data

Mar. 24, 1998 (JP) .......................................... 10-095480

(51) Int. Cl.[7] .......................... G06F 9/45; G06F 19/00; G05B 15/00
(52) U.S. Cl. .................... 703/22; 700/182; 700/184; 700/190; 700/83
(58) Field of Search .................. 703/22, 7, 1; 700/182, 700/184, 190, 83, 1, 17, 108, 109, 7; 29/592

(56) References Cited

U.S. PATENT DOCUMENTS

| | | | | |
|---|---|---|---|---|
| 4,199,814 A | * | 4/1980 | Rapp et al. .................. 700/180 |
| 4,866,635 A | * | 9/1989 | Kahn et al. .................. 364/513 |
| 4,907,164 A | * | 3/1990 | Guyder ........................ 700/173 |
| 5,266,876 A | * | 11/1993 | Ito et al. ..................... 318/568.24 |
| 5,412,583 A | * | 5/1995 | Cameron et al. ............ 700/279 |
| 5,412,877 A | * | 5/1995 | McKendrick ................ 33/567 |
| 5,485,390 A | * | 1/1996 | LeClair et al. ........... 364/474.24 |
| 5,568,028 A | * | 10/1996 | Uchiyama et al. .......... 318/566 |
| 5,659,493 A | * | 8/1997 | Kiridena et al. ............ 364/578 |
| 5,694,325 A | | 12/1997 | Fukuda et al. ........ 364/468.28 |
| 5,991,528 A | * | 11/1999 | Taylor et al. ........... 395/500.27 |
| 6,112,133 A | * | 8/2000 | Fishman ..................... 700/182 |
| 6,202,043 B1 | * | 3/2001 | Devoino et al. ............. 703/17 |
| 6,401,004 B1 | * | 6/2002 | Yamazaki et al. .......... 700/159 |

FOREIGN PATENT DOCUMENTS

| | | | |
|---|---|---|---|
| EP | 0671677 A1 | 9/1995 | ....... G05B/19/4069 |
| JP | 01189704 | 7/1989 | ........... G05B/19/18 |
| WO | WO 98/09203 | * 3/1998 | |

OTHER PUBLICATIONS

Don Meredith, "Practical Tool Condition Monitoring" Manufacturing Engineering, Jan. 1998, pp. 34–39.*

* cited by examiner

Primary Examiner—Kevin J. Teska
Assistant Examiner—Dwin M. Craig
(74) Attorney, Agent, or Firm—Pillsbury Winthrop LLP

(57) ABSTRACT

An apparatus for aiding a machinist in preparing a machining program. A machining simulator simulates a basic machining program. Values of machining variables are obtained during the simulation and stored in a simulation result data memory. A spindle load determiner, a cutting speed determiner, and a rotating speed determiner analyze the machining variable values of a certain machining process to determine the machining efficiency of that process. A navigation information memory stores a plurality of messages for giving advice on how to change the cutting conditions. A message, which depends on the analysis of the machining variable values, is selected from the memory and is shown on a display. Accordingly, an operator can easily modify the basic machining program by following the message on the display, even if the operator does not have much knowledge or experience.

21 Claims, 10 Drawing Sheets

| NJF | |
|---|---|
| Navigation Information Number | Message (MSG) |
| 1 | ·Increase cutting speed to limit value |
| 2 | ·Change cutting tool material and increase cutting speed<br>Change HSS tool (small diameter) to carbide tool<br>Change HSS tool (large diameter) to throw away tool<br>Change carbide tool to coolant through tool (for spindle through machines)<br>Change carbide tool to carbide coating tool (for non-spindle through machines) |
| 3 | ·Increase cutting speed to limit value<br>(fix cutting speed if cutting speed is equal to or higher than maximum spindle rotating speed) |
| 4 | ·Change cutting tool material and increase cutting speed<br>Change HSS tool (small diameter) to carbide tool<br>Change HSS tool (large diameter) to throw away tool |
| 5 | ·Increase cutting speed to limit value<br>(fix cutting speed if cutting speed is equal to or higher than maximum spindle rotating speed) |
| 6 | ·Change cutting tool material and increase cutting speed<br>Change carbide tool to carbide coating tool (except when the workpiece material is AL) |
| 7 | ·Decrease tool diameter and increase rotating speed |
| 8 | ·Increase cutting speed to limit value<br>(fix cutting speed if cutting speed is equal to or higher than maximum spindle rotating speed) |
| 9 | ·Change to tool with a larger teeth number and increase feed rate<br>·Change cutting tool material and increase cutting speed<br>Change HSS tool to carbide tool<br>Change carbide tool to carbide coating tool (except when the workpiece material is AL) |
| 10 | ·Change to tool with a larger teeth number and increase feed rate<br>·Change cutting tool material and increase cutting speed<br>(except when workpiece material is AL)<br>Change carbide tool to carbide coating tool or cermet tool<br>Change carbide coating tool to cermet tool |

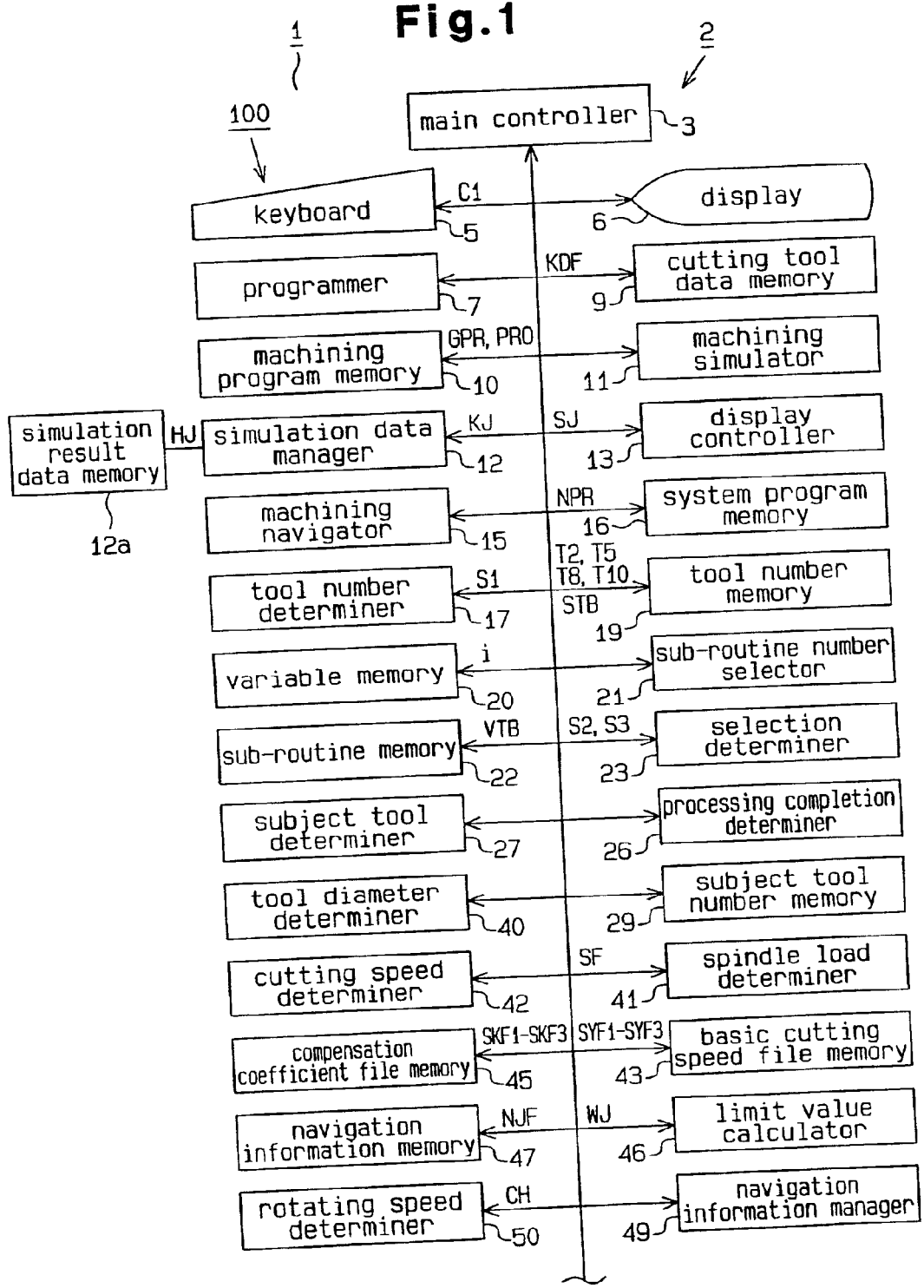

STB

| Ordinal Number (i) | 1 | 2 | 3 | 4 |
|---|---|---|---|---|
| Tool Number | T2 | T5 | T8 | T10 |

VTB

| Tool Type | Drill | End Mill (Roughing) | Face Mill (Roughing) | End Mill (Finishing) | Face Mill (Finishing) |
|---|---|---|---|---|---|
| Sub-Routine Number | 61 | 62 | 63 | 64 | 64 |

HJ(KJ)

| Tool Number | T1 | T2 | T3 | T4 | T5 | T6 | T7 | T8 | T9 | T10 |
|---|---|---|---|---|---|---|---|---|---|---|
| Maximum Spindle Load (%) | 72 | 60 | 54 | 57 | 81 | 73 | 45 | 67 | 39 | 58 |
| Cutting Speed (m/min) | 45.9 | 40.8 | 124.0 | 87.5 | 100.4 | 72.1 | 53.4 | 110.9 | 120.0 | 80.0 |
| Rotating Speed (min$^{-1}$) | 185 | 163 | 496 | 350 | 401 | 288 | 213 | 662 | 480 | 320 |

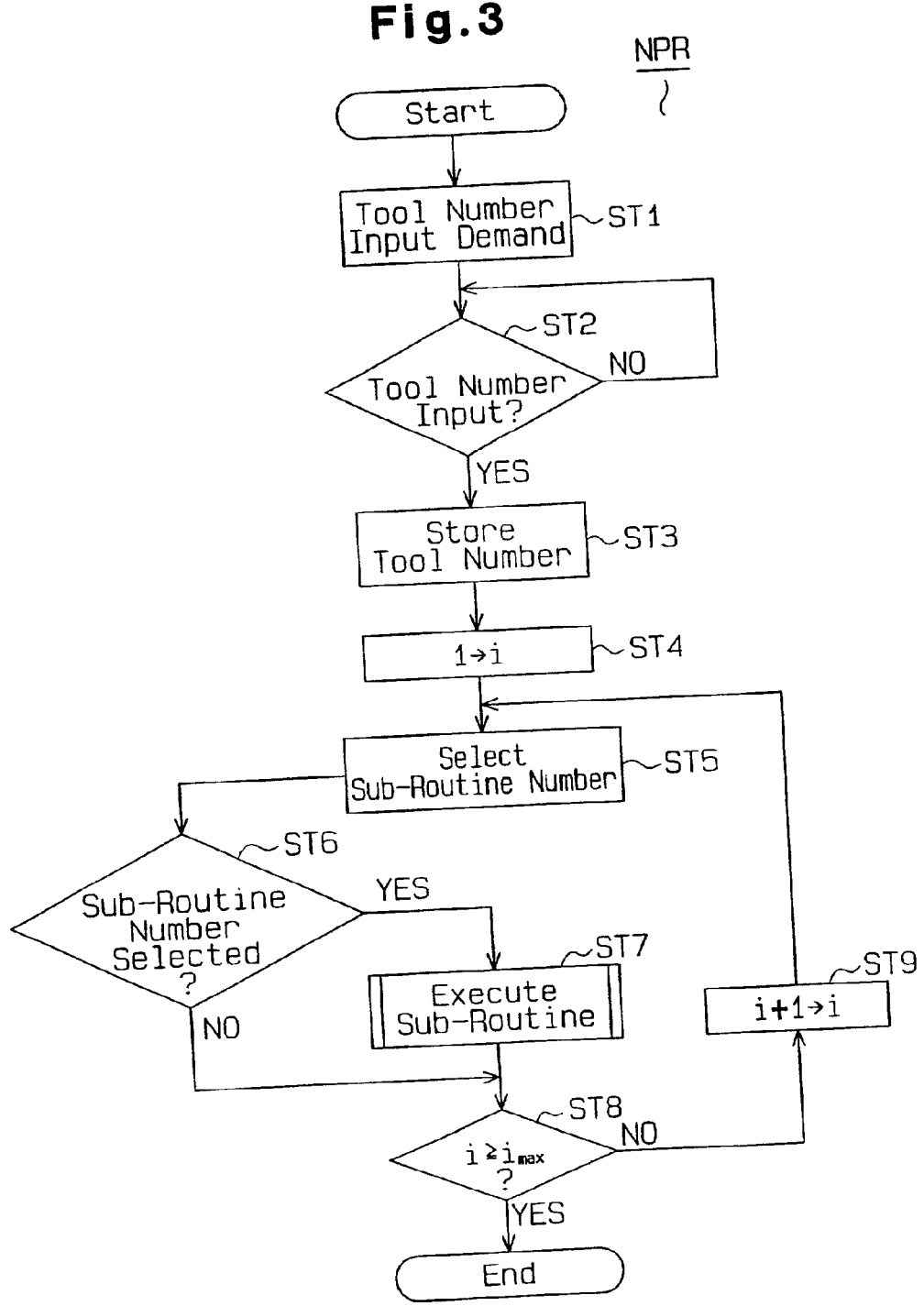

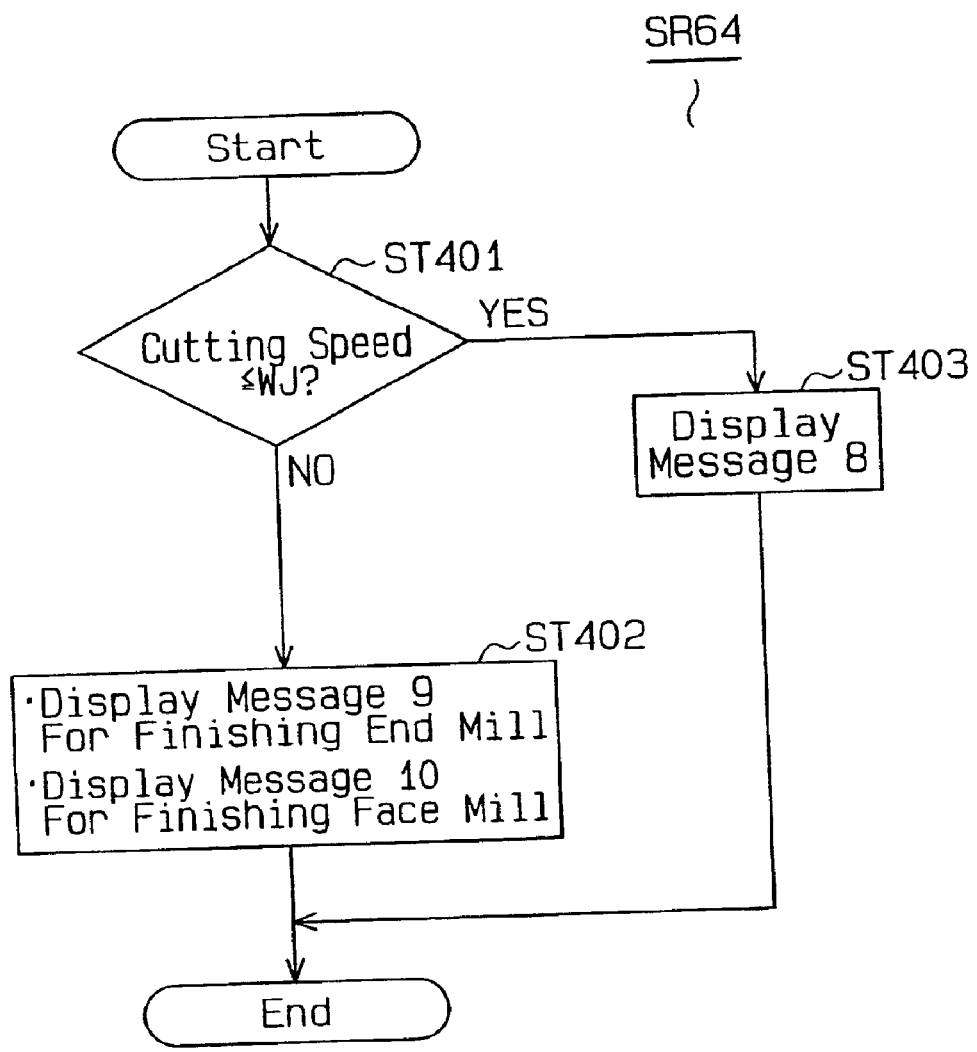

Fig. 8

NJF

| Navigation Information Number | Message (MSG) |
|---|---|
| 1 | ·Increase cutting speed to limit value |
| 2 | ·Change cutting tool meterial and increase cutting speed<br>  Change HSS tool (small diameter) to carbide tool<br>  Change HSS tool (large diameter) to throw away tool<br>  Change carbide tool to coolant through tool<br>  (for spindle through machines)<br>  Change carbide tool to carbide coating tool<br>  (for non-spindle through machines) |
| 3 | ·Increase cutting speed to limit value<br>(fix cutting speed if cutting speed is equal to or higher than maximum spindle rotating speed) |
| 4 | ·Change cutting tool meterial and increase cutting speed<br>  Change HSS tool (small diameter) to carbide tool<br>  Change HSS tool (large diameter) to throw away tool |
| 5 | ·Increase cutting speed to limit value<br>(fix cutting speed if cutting speed is equal to or higher than maximum spindle rotating speed) |
| 6 | ·Change cutting tool meterial and increase cutting speed<br>  Change carbide tool to carbide coating tool<br>  (except when the workpiece material is AL) |
| 7 | ·Decrease tool diameter and increase rotating speed |
| 8 | ·Increase cutting speed to limit value<br>(fix cutting speed if cutting speed is equal to or higher than maximum spindle rotating speed) |
| 9 | ·Change to tool with a larger teeth number and increase feed rate<br>·Change cutting tool meterial and increase cutting speed<br>  Change HSS tool to carbide tool<br>  Change carbide tool to carbide coating tool<br>  (except when the workpiece material is AL) |
| 10 | ·Change to tool with a larger teeth number and increase feed rate<br>·Change cutting tool meterial and increase cutting speed<br>  (except when workpiece material is AL)<br>  Change carbide tool to carbide coating tool or cermet tool<br>  Change carbide coating tool to cermet tool |

Fig.9(a) SYF1

| Workpiece Material | Basic Cutting Speed |
|---|---|
| FC | 30 |
| FCD | 25 |
| S45C | 30 |
| SCM | 25 |
| SUS | 15 |
| AL | 75 |
| CU | 75 |
| ⋮ | ⋮ |

Fig.9(b) SKF1

| Workpiece Material | Compensation Coefficient |
|---|---|
| HSS | 100 |
| Carbide | 220 |
| HSS Coating | 150 |
| Coolant Through | 460 |
| Throw Away | 560 |
| Brazed | 240 |
| ⋮ | ⋮ |

— ta1, ta2, ta3

Fig.10(a) SYF2

| Workpiece Material | Basic Cutting Speed |
|---|---|
| FC | 120 |
| FCD | 110 |
| S45C | 100 |
| SCM | 90 |
| SUS | 85 |
| AL | 700 |
| CU | 230 |
| ⋮ | ⋮ |

Fig.10(b) SKF2

| Workpiece Material | Compensation Coefficient |
|---|---|
| HSS | 25 |
| Carbide | 100 |
| HSS Coating | 30 |
| Carbide Coating | 110 |
| Roughing | 40 |
| Throw Away | 150 |
| ⋮ | ⋮ |

— td1, td2, td3

Fig.11(a) SYF3

| Workpiece Material | Basic Cutting Speed |
|---|---|
| FC | 140 |
| FCD | 125 |
| S45C | 200 |
| SCM | 140 |
| SUS | 200 |
| AL | 1000 |
| CU | 300 |
| ⋮ | ⋮ |

Fig.11(b) SKF3

| Workpiece Material | Compensation Coefficient |
|---|---|
| Carbide | 100 |
| Cermet | 120 |
| Carbide Coating | 115 |
| ⋮ | ⋮ |
| ⋮ | ⋮ |
| ⋮ | ⋮ |

— tf1, tf2, tf3

US 6,885,984 B1

APPARATUS AND METHOD FOR AIDING PROGRAMMING

BACKGROUND OF THE INVENTION

The present invention relates to an apparatus for aiding the programming of machining programs, which are used by machine tools.

Numerically controlled (NC) machine tools, such as machining centers, machine workpieces in accordance with predetermined machining programs. An NC machine tool has a control unit that includes a memory, which stores machining conditions (i.e., the feed rate and cutting speed of cutting tools, the spindle rotating speed). To make a machining program, an operator feeds information, such as the type of tool used or the workpiece material, to the control unit with an input device. The control unit then refers to the input information to select the appropriate cutting conditions from the data stored in the memory. The selected cutting conditions are then inserted into the machining program.

The cutting conditions stored in the memory are generalized values that can be used for various types of cutting tools and workpiece materials. The generalized cutting conditions can also be used regardless of how the machine tool clamps the workpiece or how the spindle clamps the cutting tool. However, the generalized cutting conditions are not optimal for high speed machining. Therefore, the cutting condition values are changed during programming in accordance with the capacity of the spindle motor, or the like, to make a program that enables high speed machining.

However, the operator must have much knowledge and experience with regard to machine tools and cutting tools to set the appropriate cutting conditions. Thus, it is difficult to set the cutting conditions that are optimal for high speed machining.

SUMMARY OF THE INVENTION

Accordingly, it is an objective of the present invention to provide an apparatus for aiding the programming of machining programs that facilitates the adjustment of cutting conditions and thereby improves machining efficiency.

To achieve the above objective, the present invention provides an apparatus for aiding a machinist in preparing a programmed machine for a machining process. A basic program is run for setting values of various machining variables based on information input by the machinist. The apparatus includes an analyzing means for analyzing the variable values to determine the efficiency of the machining process, and a notifying means for notifying an advisory message to the machinist regarding on how to improve the machining process in accordance with the analysis performed by the analyzing means.

In a further aspect of the present invention, a method for aiding a machinist in preparing a programmed machine for a machining process is provided. A basic program is run for setting values of various machining variables based on information input by the machinist. The method includes analyzing the current values of the machining variables to determine the current efficiency of the machining process, and notifying an advisory message to the machinist regarding on how to improve the machining process in accordance with the analysis.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1 is a block diagram showing a navigation apparatus functioning as a programming aiding apparatus according to the present invention;

FIG. 3 is a flowchart showing the contents of a navigation program;

FIG. 7 is a flowchart showing the contents of a fourth sub-routine;

FIG. 8 is a table showing a navigation data file;

FIG. 9(a) is a table showing a first basic cutting speed file;

FIG. 9(b) is a table showing a first compensation coefficient file;

FIG. 10(a) is a table showing a second basic cutting speed file;

FIG. 10(b) is a table showing a second compensation coefficient file;

FIG. 11(a) is a table showing a third basic cutting speed file;

FIG. 11(b) is a table showing a third compensation coefficient file; and

DETAILED DESCRIPTION OF THE PREFERRED EMBODIMENTS

Figures 2A, 2B, 2C, 2D:
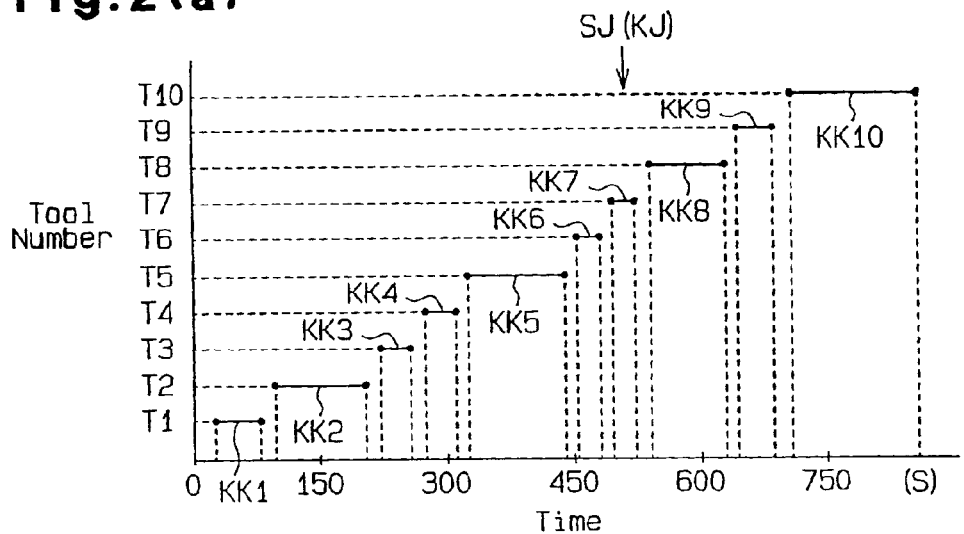
FIG. 2(a) is a graph showing machining timing data.
FIG. 2(b) is a table showing the processing procedures.
FIG. 2(c) is a table showing sub-routine numbers.
FIG. 2(d) is a table showing machining state information.

An embodiment of the present invention will now be described with reference to the drawings. As shown in FIG. 1, a machining center 1 has a control unit 100. The control unit 100 includes a navigation apparatus 2, which functions as a programming aiding apparatus.

The navigation apparatus 2 has a main controller 3. The main controller 3 is connected to various devices by buses. Such devices include a keyboard 5, a display 6, a programmer 7, a tool data memory 9, a machining program memory 10, a machining simulator 11, a simulation data manager 12, a display controller 13, a machining navigator 15, a system program memory 16, a tool number determiner 17, a tool number memory 19, a variable memory 20, a sub-routine number selector 21, a sub-routine number memory 22, a selection determiner 23, a processing completion determiner 26, a subject tool determiner 27, a subject tool number memory 29, a tool diameter determiner 40, a spindle load determiner 41, a cutting speed determiner 42, a basic cutting speed file memory 43, a compensation coefficient file memory 45, a limit value calculator 46, a navigation information memory 47, a navigation information manager 49, and a rotating speed determiner 50. A simulation result data memory is connected to the simulation data manager 12.

To make a machining program PRO, a machinist, or operator, first inputs information, such as the tool number of the tool or tools that will be used for machining, the material of the workpiece subject to machining, and the type of machining that is to be carried out with the keyboard 5, which functions as an input device. The tool data memory 9 stores a tool data file KDF, which is known in the art. The tool data file KDF is formed by tables of data. A data table is provided for each cutting tool number. Each table includes information related to the associated cutting tool, such as the type and material of the cutting tool, the appropriate feed rate and cutting speed of the cutting tool, and the appropriate rotating speed of the spindle to which the cutting tool is attached.

The programmer 7 refers to the tool data file KDF, which is stored in the tool data memory 9, and determines the cutting conditions (feed rate, cutting speed, and spindle rotating speed) of each designated cutting tool based on the information input through the keyboard 6. The programmer 7 uses the determined cutting conditions to make a basic machining program GPR with a known automatic programming method. The basic machining program GPR is then stored in the machining program memory 10. In this embodiment, the final machining program PRO is made by improving part of the basic machining program GPR in a manner that will be described later.

After completion and storage of the basic machining program GPR, the operator inputs a command through the keyboard 5 to simulate the basic machining program GPR. The main controller 3 receives the command and executes the machining simulation with the machining simulator 11. The machining simulator 11 then reads the basic machining program GPR, which is stored in the machining program memory 10, to execute the simulation using a simulation method known in the art.

During the execution of the machining simulation, the machining simulator 11 transmits simulation result information KJ, which is related to the machining simulation, to the simulation data manager 12 using a method known in the art. The simulation data manager 12 stores the simulation result information KJ and further transmits the information KJ to the display controller 13. The display controller 13 then displays the information KJ on the display 6 as numerical figures and graphs.

An example of the machining processes included in the basic machining program GPR is shown in FIG. 2(a). In this case, cutting tools numbered T1 to T10 are employed. The cutting tools T1 to T10 sequentially perform machining processes KK1 to KK10, respectively. The simulation result information KJ includes machining time data SJ, which indicates the initiating time and terminating time of each machining process. Accordingly, the information shown on the display 6 includes the machining time data SJ, which is displayed as a graph like that shown in FIG. 2(a).

In addition to the machining time data SJ, the simulation result information KJ includes values of machining variables HJ, which indicates the state of the spindle and tool in each machining step KK1 to KK10. The values of machining variables HJ may be in the form of a table, such as that shown in FIG. 2(d), indicating the maximum spindle load, the tool cutting speed, and the spindle rotating speed, in correspondence with each cutting tool number T1 to T10. The maximum spindle load indicates the maximum value of the torque load acting on the spindle during machining relative to the tolerated maximum torque load of the spindle. The spindle rotating speed is indicated as rotating speed per minute.

Upon completion of the machining simulation, the operator inputs a machining navigation command C1 with the keyboard 5. The main controller 3 receives the command C1 and executes machining navigation with the machining navigator 15. The machining navigator 15 reads out a navigation program NPR (FIG. 3), which is stored in the system program memory 16, to execute the machining navigation. The machining navigation is a programming aiding process in which specific advice is given to the operator on how to improve the basic machining program GPR.

The machining navigation will now be described with reference to the flowchart of FIG. 3. When initiating machining navigation, at step ST1, the machining navigator 15 commands the display controller 13 to generate a message on the display 6 demanding the designation of the machining process that is to be subjected to machining navigation. The operator designates the subject machining process by inputting the number of the cutting tool used in that process.

When designating the subject machining process, the operator refers to the machining time data SJ to locate the machining process that should undergo machining navigation. For example, the operator selects the machining process for which the machining time is relatively long. The operator then inputs the number assigned to the cutting tool used in the selected machining process with the keyboard 5. For example, in FIG. 2(a), the machining time of machining processes KK2, KK5, KK8, and KK10 are relatively long. In this case, the operator inputs the corresponding tool numbers T2, T5, T8, and T10 with the keyboard 5.

Returning to FIG. 3, at step ST2, the tool number determiner 17 determines whether or not the tool numbers have been input. If the tool numbers T2, T5, T8, T10 are determined to have been input, the determiner 17 outputs an input completion signal S1.

If the input completion signal S1 is output, at step ST3, the machining navigator 15 stores the input tool numbers T2, T5, T8, T10 in a tool number memory 19. As shown in FIG. 2(b), the tool number memory 19 includes a processing table STB that assigns a sequential processing ordinal number (1st, 2nd, 3rd, and so forth) to each tool.

At step ST4, the machining navigator 15 sets an ordinal variable i, which is stored in the variable memory 20, to an initial value of 1. The ordinal variable i represents the order of a given tool that undergoes machining navigation. At step ST5, the machining navigator 15 commands the sub-routine number selector 21 to select the number of a sub-routine (described later). The sub-routine number selector 21 first commands the subject tool determiner 27 to determine the type of the subject cutting tool.

The subject tool determiner 27 refers to the processing table STB (FIG. 2(b)), which is stored in the tool number memory 19, according to the current value of the ordinal variable i, which is stored in the variable memory 20. For example, if the variable i indicates the initial value of 1, the tool that is to be used first in the processing table STB of FIG. 2(b) is selected. In this case, the tool number assigned to ordinal number 1 is T2. Thus, the subject tool determiner 27 selects tool number T2 and stores the selected number in the subject tool number memory 29. Furthermore, the subject tool determiner 27 determines the type of the cutting tool corresponding to the selected tool number by referring to the tool data file KDF, which is stored in the tool data memory 9.

The sub-routine memory 22 stores a sub-routine number table VTB, which indicates a sub-routine number corresponding to each type of cutting tool, as shown in FIG. 2(c). For example, in the sub-routine table VTB of FIG. 2(c), four sub-routine numbers 61, 62, 63, 64 are assigned to five types of cutting tools. The four sub-routines 61, 62, 63, 64 are associated with first, second, third, and fourth sub-routines SR61, SR62, SR63, SR64, illustrated in FIGS. 4, 5, 6, and 7, respectively.

When the subject tool determiner 27 determines the tool type of the selected tool number, the sub-routine number selector 21 refers to the sub-routine number table VTB to select the sub-routine number assigned to the determined cutting tool type. For example, if the cutting tool assigned to the selected tool number T2 is a drill, the sub-routine number selector 21 selects sub-routine number 61 from the sub-routine number table VTB of FIG. 2(c).

Figure 4:
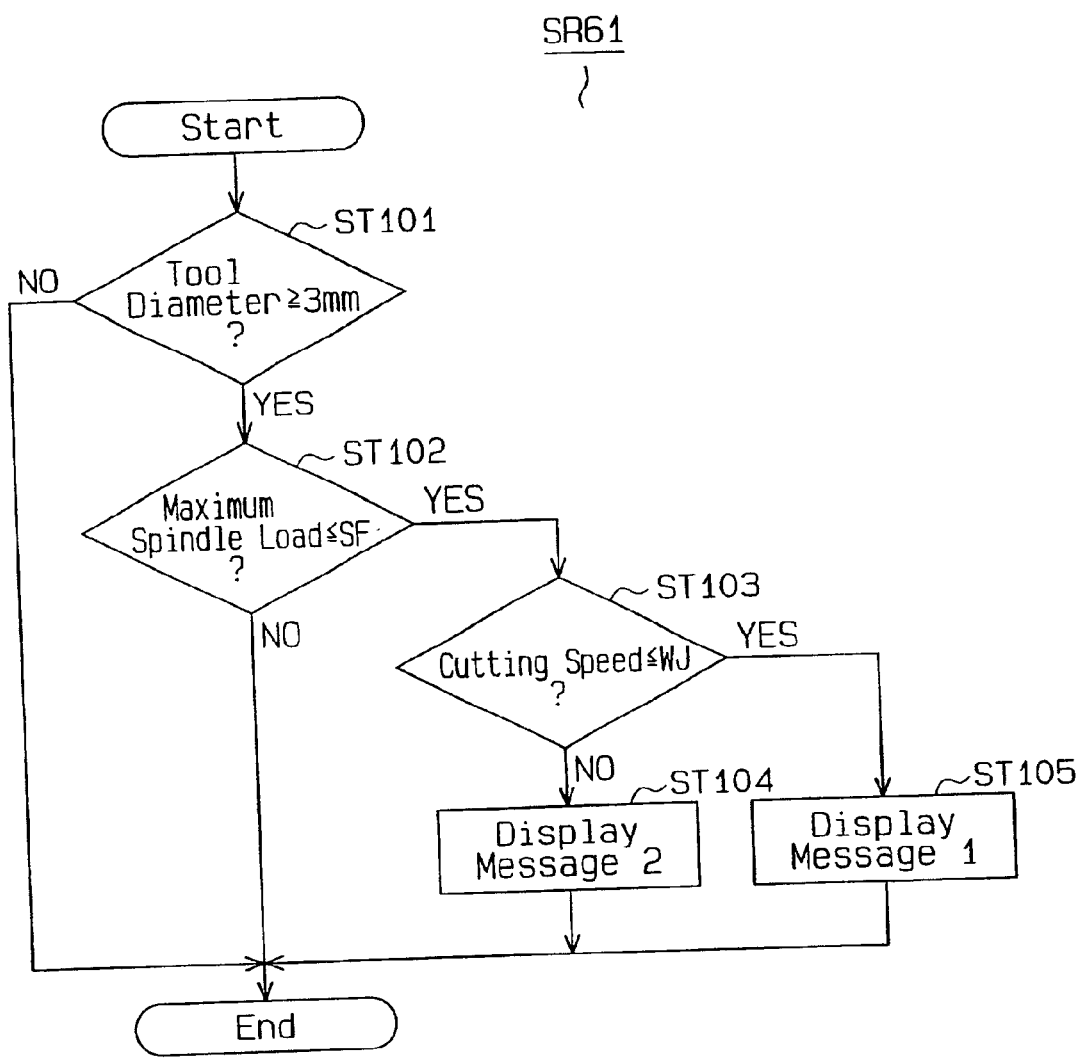
FIG. 4 is a flowchart showing the contents of a first sub-routine.

At step ST6, the selection determiner 23 determines whether or not the sub-routine number selector 21 has selected a sub-routine number. If it is determined that a sub-routine number has been selected, the selection determiner 23 outputs a selection completion signal S2. When the selection completion signal S2 is output, at step ST7, the machining navigator 15 executes the sub-routine that has the selected sub-routine number. For example, if the selected sub-routine number is 61, the first sub-routine SR61, shown in FIG. 4, is executed. Afterward, step ST8, which is described later, is carried out upon completion of the execution of the sub-routine.

If it is determined that a sub-routine number has not been selected in step ST6, the selection determiner 23 outputs a non-selection signal S3. For example, if the cutting tool type is a reamer or a boring bar, the sub-routine number selector 21 cannot select a sub-routine number since the sub-routine number table VTB of FIG. 2(c) does not include these tool types. When the non-selection signal S3 is output, none of the sub-routines is carried out. In such case, the machining navigation proceeds to step ST8. In other words, machining processes performed by cutting tools that are not included in the sub-routine number table VTB of FIG. 2(c) are not subject to machining navigation.

At step ST8, the processing completion determiner 26 judges whether or not the ordinal variable i stored in the variable memory 20 has reached a maximum value $i_{max}$. For example, in FIG. 2(b), the ordinal number i assigned to the four tool numbers T2, T5, T8, and T10 is 1, 2, 3, and 4, respectively. Thus, the maximum value $i_{max}$ of the ordinal variable i is 4. If the processing completion determiner 26 determines that the ordinal variable i has not reached the maximum value $i_{max}$, step ST9 is performed. In step ST9, the machining navigator 15 adds one to the variable i in an incremental manner. Afterward, the processing returns to step ST5. Subsequently, in the same manner as described above, the selection of the tool number assigned to the current value of the ordinal variable i, determination of the type of the cutting tool assigned with the selected tool number, and selection of the sub-routine number assigned to the determined tool type are carried out.

If the processing completion determiner 26 determines that the ordinal variable i has reached the maximum value $i_{max}$, the machining navigator 15 terminates the navigation program NPR.

The first, second, third, and fourth sub-routines SR61, SR62, SR63, SR64 illustrated in FIGS. 4, 5, 6, 7, respectively, will now be described in detail. As shown in FIG. 2(c), the first sub-routine SR61, which is illustrated in FIG. 4, is executed when the cutting tool is a drill. In the first sub-routine, at step ST101, the machining navigator 15 commands the tool diameter determiner 40 to determine the diameter of the selected cutting tool. The tool diameter determiner 40 refers to the tool data file KDF, which is stored in the tool data memory 9, to determine the diameter of the current subject tool. The tool whose number is currently stored in the subject tool number memory 29 is the current subject tool. The tool diameter determiner 40 then judges whether or not the diameter of the subject tool is equal to or greater than a predetermined value (3 mm in FIG. 4).

If the diameter of the cutting tool is smaller than 3 mm, it is difficult to change the cutting speed of the tool. Thus, the machining navigator 15 terminates the sub-routine without executing the machining navigation.

If the diameter of the cutting tool is 3 mm or greater, at step ST102, the spindle load determiner 41 determines the load applied to the spindle. More specifically, the spindle load determiner 41 refers to the values of machining variables HJ (FIG. 2(d)) to determine the maximum load applied to the spindle (maximum spindle load) by the cutting tool assigned to the tool number currently stored in the subject tool number memory 29. The spindle load determiner 41 then judges whether or not the maximum spindle load is equal to or lower than a predetermined limit value SF. The limit value SF is one of the parameters used to determine the machining efficiency and may be set, for example, at 80%. Furthermore, the limit value SF may be changed arbitrarily before executing the navigation program NPR.

If the maximum spindle load is greater than the limit value SF, the spindle load should not be further increased. Thus, the machining navigator 15 terminates the sub-routine without executing the machining navigation. If the maximum spindle load is equal to or smaller than the limit value SF, the spindle load can be further increased. Thus, the machining navigator 15 proceeds to step ST103.

For example, if T2 is the tool number stored in the subject tool number memory 29, the maximum spindle load is 60% as shown by the values of machining variables HJ of FIG. 2(d). Hence, if the limit value SF is 80%, the maximum spindle load is lower than the limit value SF. In this case, the sub-routine proceeds to step ST103.

At step ST103, the cutting speed determiner 42 determines the cutting speed of the subject cutting tool. More specifically, the cutting speed determiner 42 refers to the values of machining variables HJ (FIG. 2(d)) to determine the cutting speed of the tool assigned to the tool number stored in the subject tool number memory 29. The cutting speed determiner 42 then judges whether or not the cutting speed is equal to or lower than a limit value WJ, which is computed by the limit value calculator 46. The limit value WJ is also one of the parameters used to determine the machining efficiency.

The limit value calculator 46 refers to the first basic cutting speed file SYF1, which is illustrated in FIG. 9(a) and stored in the basic cutting speed file memory 43, and a first compensation coefficient file SKF1, which is illustrated in FIG. 9(b) and stored in the compensation coefficient file memory 45, to compute the cutting speed limit value WJ.

The first basic cutting speed file SYF1, shown in FIG. 9(a), and the first compensation coefficient file SKF1, shown in FIG. 9(b), are used for drills. As shown in FIG. 9(a), the first basic cutting speed file SYF1 indicates the cutting speed limit value of the cutting tool (drill) for different types of workpiece materials. As shown in FIG. 9(b), the first compensation coefficient file SKF1 includes a plurality of tables ta1, ta2, ta3, and so forth. Each table corresponds to one of the workpiece materials listed in the first basic cutting speed file SYF1. Each table indicates the compensation coefficient for different types of cutting tool materials. The compensation coefficient is used to compensate the basic cutting speed of the workpiece material listed in the first basic cutting speed file SYF1.

Each table of the first compensation coefficient file SKF1 lists not only cutting tool materials but also the structure or usage of the cutting tool. For example, as shown in FIG. 9(b), HSS (high-speed steel) and carbide refer to tool tip materials. Coolant through refers to the tool structure and indicates tools having passages through which coolant flows. Throw away refers to the tool usage and indicates disposable tools.

The calculator 46 refers to the basic machining program GPR stored in the machining program memory 10 to determine the material of the subject workpiece. The calculator 46 also refers to the cutting tool data file KDF in the cutting tool data memory 9 to determine the material of the cutting tool assigned with the tool number stored in the subject tool number memory 29. Afterward, the calculator 46 selects the basic cutting speed that corresponds to the material of the workpiece from the first basic cutting speed file SYF1 of FIG. 9(a). The calculator 46 further selects the table corresponding to the subject workpiece material from the first compensation coefficient file SKF1 of FIG. 9(b) to locate the compensation coefficient corresponding to the tool material. The calculator 46 then multiplies the selected basic cutting speed with the selected compensation coefficient to obtain the cutting speed limit value WJ of the subject cutting tool (drill). Accordingly, the type and material of the cutting tool (drill) used for machining and the material of the subject workpiece are taken into consideration when computing the limit value WJ.

For example, under the assumption that the subject cutting tool is a carbide drill and the material of the workpiece is FC (gray cast iron), the basic cutting speed corresponding to FC is 30 m/min as shown in the first basic cutting speed file SYF1 of FIG. 9(a). It is also assumed here that the workpiece material corresponding to table ta1 of the first compensation coefficient file SKF1 of FIG. 9(b) is FC. Since the material of the drill is carbide, the corresponding compensation coefficient is 220%, as shown in table ta1. Accordingly, the cutting speed limit value WJ is 66 m/min. Other factors such as the tool diameter, the cutting width, the cutting depth, the workpiece rigidity, and how the cutting tool is attached to the spindle may also be taken into consideration when computing the limit value WJ.

At step ST103, the cutting speed determiner 42 judges whether or not the cutting speed of the drill is equal to or lower than the limit value WJ. If the cutting speed is higher than the limit value WJ, step ST104 is carried out. If the cutting speed is equal to or lower than the limit value WJ, step ST105 is carried out. At steps ST104 and ST105, the navigation information manager 49 reads out predetermined navigation information from the navigation information memory 47 and displays the information on the display 6.

The navigation information memory 47 stores navigation information NJF such as that shown in FIG. 8. The navigation data NJF includes 10 messages MSG, each assigned with a different navigation information number of 1 to 10. The table of FIG. 8 lists exemplary messages. Thus, the messages are not limited to those of FIG. 8 and may be changed as required. The messages MSG show specific advice for improving the basic machining program GPR to perform faster machining and to improve the machining efficiency.

If it is determined that the cutting speed of the tool is higher than the cutting speed limit value WJ in step ST103, this indicates that the spindle load may still be increased (step ST102). However, the cutting speed of the tool, which has been designated in the basic machining program GPR, cannot be increased since it has already exceeded the limit value WJ. In such case, the sub-routine proceeds to step ST104. At step ST104, the navigation information manager 49 reads out the message MSG designated as navigation information number 2 from the navigation information memory 47 and transmits the message MSG to the display controller 13. The display controller 13 then displays the received message MSG on the display 6.

As shown in FIG. 8, the message MSG assigned with number 2 advises changing the cutting tool material so that the cutting speed may be increased. A change in the material of the cutting tool changes the compensation coefficient that is selected from the first compensation coefficient file SKF1. Accordingly, if the cutting tool material is changed to obtain a larger compensation coefficient, the cutting speed limit value WJ is increased. Since this permits an increase in the cutting tool speed, faster machining can be performed.

In the above example, the material of the drill is designated as carbide, while the workpiece material is designated as FC in the basic machining program GPR. Thus, the compensation coefficient is determined to be 220% from table ta1 of the first compensation coefficient SKF1 shown in FIG. 9(b). In this case, the message MSG designated as number 2 appears on the display 6 so that the operator can acknowledge that the cutting speed may be increased if the carbide drill is changed to a coolant through type drill (assuming that the spindle has a coolant passage for permitting the flow of coolant into the cutting tool). When a coolant through cutting tool is employed, the compensation coefficient is 460% as shown in table ta1 of the first compensation coefficient SKF1 (FIG. 9(b)).

The message MSG (number 2) that appears on the display 6 advises the operator to change the cutting tool material so that the cutting speed can be increased. Thus, upon completion of the navigation program NPR, the operator can improve the cutting conditions of the subject machining process in the basic machining program GPR (in this case, the cutting tool material) by changing the cutting tool material. Correction of the machining program PRO increases the cutting speed limit value WJ. Therefore, the cutting speed may be increased within the range of the load tolerated by the spindle.

As described above, the navigation apparatus 2 advises the operator on how the machining program can be improved by displaying a message MSG on the display 6. Thus, the operator can easily make a machining program that permits high speed and efficient machining just by following the advise given by the navigation apparatus 2.

If the cutting speed is lower than the limit value WJ in step ST103, the spindle load and the cutting speed can both be increased. In this case, at step ST105, the navigation information manager 49 reads out the message MSG that corresponds to navigation information number 1 from the navigation information memory 47 and transmits the message MSG to the display controller 13. The display controller 13 then displays the received message MSG on the display 6.

As shown in FIG. 8, the message MSG designated as number 1 indicates that the cutting speed may be increased to the limit value. Hence, when this message appears on the display 6, the operator is notified that the cutting speed may be increased without changing the cutting tool. It is preferred that the limit value WJ, which is computed by the calculator 46, be shown on the display 6 in addition to the message MSG (number 1). Accordingly, the operator can easily determine the extent to which the cutting speed of the subject cutting tool may be increased.

The message MSG (number 1) that appears on the display 6 advises the operator to increase the cutting speed within the range defined by the limit value WJ. Accordingly, upon completion of the navigation program NPR, the operator can improve the cutting conditions of the subject machining process in the basic machining program GPR by increasing the cutting speed. Correction of the machining program PRO increases the cutting speed in the subject machining process. Thus, machining is performed with high speed and high efficiency.

The first sub-routine SR61 is completed when either step ST104 or step ST105 is finished.

Figure 5:
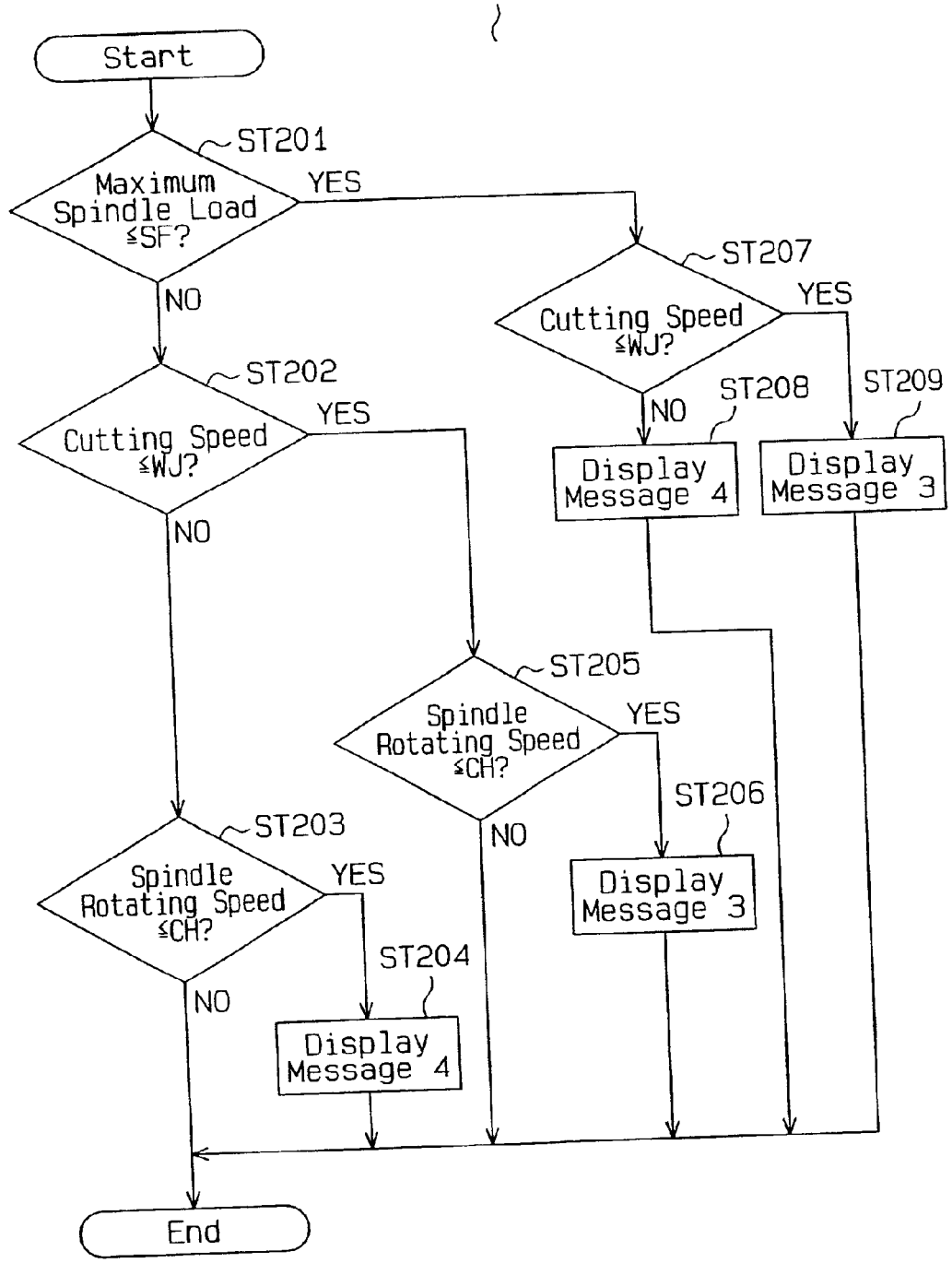
FIG. 5 is a flowchart showing the contents of a second sub-routine.

The second sub-routine SR62, which is illustrated in FIG. 5, will now be described in detail. As shown in FIG. 2(c), the second sub-routine SR62 is executed when the subject cutting tool is a roughing end mill. At step ST201, in the same manner as step ST102, the spindle load determiner 41 determines the load applied to the spindle. More specifically, the spindle load determiner 41 judges whether or not the maximum load applied to the spindle (maximum spindle load) by the cutting tool designated by the tool number stored in the subject tool number memory 29 is equal to or lower than a predetermined limit value SF (e.g., 80%). If the maximum spindle load is greater than the limit value SF, step ST202 is carried out.

For example, when the cutting tool number T5 stored in the subject tool number memory 29 is T5, the values of machining variables HJ (FIG. 2(d)) indicates that the maximum spindle load of the tool is 81%. If the limit value SF is 80%, the maximum spindle load is greater than the limit value SF. In this case, the sub-routine SR62 proceeds to step ST202.

At step ST202, in the same manner as step ST103 in FIG. 4, the cutting speed determiner 42 refers to the values of machining variables HJ (FIG. 2(d)) to determine the cutting speed of the end mill, the tool number of which is stored in the subject tool number memory 29. The cutting speed determiner 42 then judges whether or not the cutting speed of the end mill is equal to or lower than the limit value WJ, which is computed by the calculator 46.

The calculator 46 refers to the second basic cutting speed file SYF2, which is illustrated in FIG. 10(a) and stored in the basic cutting speed file memory 43, and the second compensation coefficient file SKF2, which is illustrated in FIG. 10(b) and stored in the compensation coefficient file memory 45, to compute the cutting speed limit value WJ. The second basic cutting speed file SYF2 of FIG. 10(a) and the second compensation coefficient file SKF2 of FIG. 10(b) are referred to when the cutting tool is an end mill.

As shown in FIG. 10(a), the second basic cutting speed file SYF2 indicates the cutting speed limit value of the cutting tool (end mill) for different types of workpiece materials. As shown in FIG. 10(b), the second compensation coefficient file SKF2 includes a plurality of tables td1, td2, td3, and so forth. Each table corresponds to one of the workpiece materials listed in the second basic cutting speed file SYF2. Each table indicates the compensation coefficient for different types of cutting tool materials. The compensation coefficient is used to compensate the basic cutting speed of the workpiece material listed in the second basic cutting speed file SYF2. In the same manner as the first compensation coefficient file SKF1 of FIG. 9(b), the second compensation coefficient file SKF2 lists not only cutting tool materials but also the structure or usage of the cutting tool.

The calculator 46 refers to the basic machining program GPR stored in the machining program memory 10 to determine the material of the subject workpiece. The calculator 46 also refers to the cutting tool data file KDF in the cutting tool data memory 9 to determine the material of the cutting tool designated by the tool number stored in the subject tool number memory 29. Afterward, the calculator 46 selects the basic cutting speed that corresponds to the material of the workpiece from the second basic cutting speed file SYF2 of FIG. 10(a). The calculator 46 further selects the table corresponding to the subject workpiece material from the second compensation coefficient file SKF2 of FIG. 10(b) to locate the compensation coefficient corresponding to the tool material. The calculator 46 then multiplies the selected basic cutting speed with the selected compensation coefficient to obtain the cutting speed limit value WJ of the subject cutting tool (end mill).

At step ST202, the cutting speed determiner 42 judges whether or not the cutting speed of the subject cutting tool is equal to or lower than the computed limit value WJ. If the cutting speed is higher than the limit value WJ, the sub-routine SR62 proceeds to step ST203. At step ST203, the rotating speed determiner 50 determines the spindle rotating speed. More specifically, the rotating speed determiner 50 refers to the values of machining variables HJ (FIG. 2(d)) stored in a simulation result data memory 12a to determine the spindle rotating speed of the cutting tool designated by the number stored in the subject tool number memory 29. The rotating speed determiner 50 determines whether the spindle rotating speed is equal to or lower than a predetermined base value CH. The base value CH is one of the parameters used to judge machining efficiency. If the spindle rotating speed reaches the base value CH, the output of the spindle becomes maximum and is maintained at a constant value. In other words, the maximum output of the spindle increases as the spindle rotating speed increases until the spindle rotating speed reaches the base value CH. Accordingly, if the spindle rotating speed is equal to or lower than the base value CH, the output of the spindle can still be increased.

If it is determined that the spindle rotating speed is higher than the base value CH in step ST203, this indicates that the spindle load cannot be increased (step ST201), the cutting speed cannot be further decreased (step ST202), and that the maximum output of the spindle cannot be increased even if the spindle rotating speed is further increased. In such case, the efficiency of the machining process cannot be further improved. Thus, the sub-routine is terminated without executing the machining navigation.

On the other hand, if it is determined that the spindle rotating speed is equal to or lower than the base value CH in step ST203, this indicates that, although the spindle load and cutting speed cannot be further increased, the maximum output of the spindle may be increased if the spindle rotating speed is increased. In such case, at step ST204, the navigation information manager 49 reads out the message MSG that corresponds to navigation information number 4 from the navigation information memory 47 and transmits the message MSG to the display controller 13. The display controller 13 then displays the received message MSG on the display 6. When step ST204 is finished, the sub-routine is terminated.

As shown in FIG. 8, the message MSG assigned with number 4 advises the operator to change the material of the cutting tool to increase the cutting speed. A change in the material of the cutting tool changes the compensation coefficient that is selected from the second compensation coefficient file SKF2. Accordingly, if the cutting tool material is changed to obtain a larger compensation coefficient, the cutting speed limit value WJ is increased. This permits an increase in the spindle rotating speed and the cutting tool speed. An increase in the spindle rotating speed increases the maximum output of the spindle. In such state, the spindle load can be increased. The cutting speed of the tool can be increased as long as the spindle load does not exceed the value stored in the values of machining variables HJ (FIG. 2(d)).

For example, if the subject cutting tool designated in the basic machining program GPR is a small diameter end mill, the material of which is HSS, and the corresponding table in the second compensation coefficient file SKF2 (FIG. 10(b)) is td1, the compensation coefficient is 25%. In such case, when the message MSG designated as number 4 appears on the display 6, the operator is notified that the cutting speed may be increased by changing the HSS end mill to a carbide end mill. If a carbide end mill is used, the compensation coefficient is 100%, as shown in table td1 of the second compensation coefficient SKF2 (FIG. 10(b)).

Accordingly, upon completion of the navigation program NPR, the operator can improve the cutting conditions of the subject machining process in the basic machining program GPR, by increasing the cutting speed. Correction of the basic machining program GPR further corrects the machining program PRO and increases the cutting speed limit value WJ in the subject machining process. Thus, the cutting speed is increased within the extent permitted by the maximum output of the spindle.

If the cutting speed of the subject cutting tool is equal to or lower than the limit value WJ in step ST202, step ST205 is carried out. At step ST205, in the same manner as step ST203, the rotating speed determiner 50 judges whether or not the spindle rotating speed is equal to or lower than the base value CH. If the spindle rotating speed is higher than the base value CH, the spindle load cannot be increased and the spindle output cannot be increased, although the cutting speed can. In other words, since the maximum output of the spindle cannot be increased even if the spindle rotating speed is increased, the spindle load cannot be increased. In such case, the efficiency of the subject machining process cannot be improved. Thus, the sub-routine is terminated without executing the machining navigation.

If it is determined that the spindle rotating speed is equal to or lower than the base value CH in step ST205, the spindle load cannot be decreased, but the cutting speed and the spindle output may be increased. In other words, the spindle load may be increased if the maximum output of the spindle is increased by increasing the spindle rotating speed. In such case, at step ST206, the navigation information manager 49 reads out the message MSG that corresponds to navigation information number 3 from the navigation information memory 47 and transmits the message MSG to the display controller 13. The display controller 13 then displays the received message MSG on the display 6. When step ST206 is finished, the sub-routine is terminated.

As shown in FIG. 8, the message MSG designated as number 3 indicates that the cutting speed of the subject cutting tool may be increased to the limit value WJ. Accordingly, if the message MSG (number 3) appears on the display 6, the operator is notified that the cutting speed may be increased without changing the cutting tool.

Accordingly, upon completion of the navigation program NPR, the operator can improve the cutting conditions of the subject machining process in the basic machining program GPR by increasing the cutting speed within the range defined by the limit value WJ in accordance to the message MSG (number 3) shown on the display 6. Correction of the basic machining program GPR further corrects the machining program PRO and increases the cutting speed in the subject machining process. The cutting speed of the tool can be increased as long as the spindle load does not exceed the value stored in the values of machining variables HJ (FIG. 2(d)).

If it is determined that the maximum spindle load is equal to or lower than the limit value SF in step ST201, step ST207 is performed. At step ST207, the cutting speed determiner 42 determines the cutting speed of the subject cutting tool in the same manner as step ST202. If the cutting speed is higher than the limit value WJ, the spindle load can be increased but the cutting speed cannot. In this case, at step ST208, in the same manner as step ST204, the navigation information manager 49 reads out the message MSG that corresponds to navigation information number 4 from the navigation information memory 47 and transmits the message MSG to the display controller 13. The display controller 13 then displays the received message MSG on the display 6. When step ST208 is finished, the sub-routine is terminated.

As shown in FIG. 8, the message MSG designated as number 4 advises changing the cutting tool material so that the cutting speed may be increased. A change in the material of the cutting tool changes the compensation coefficient that is selected from the third compensation coefficient file SKF3. Therefore, if the cutting tool material is changed to obtain a larger compensation coefficient, the cutting speed limit value WJ is increased, which permits a higher cutting speed.

Accordingly, upon completion of the navigation program NPR, the operator can improve the cutting conditions of the subject machining process in the basic machining program GPR by increasing the cutting speed within the range defined by the limit value WJ. Correction of the machining program PRO increases the cutting speed limit value WJ in the subject machining process and the cutting speed accordingly.

At step ST207, if the cutting speed is equal to or lower than the limit value WJ, the spindle load and the cutting speed can both be increased. In such case, at step ST209, in the same manner as step ST206, the navigation information manager 49 reads out the message MSG that corresponds to navigation information number 3 from the navigation information memory 47 and transmits the message MSG to the display controller 13. The display controller 13 then displays the received message MSG on the display 6. When step ST209 is finished, the sub-routine is terminated.

As shown in FIG. 8, the message MSG assigned to number 3 indicates that the cutting speed of the subject cutting tool may be increased to the limit value WJ. Therefore, if the message MSG (number 3) appears on the display 6, the operator is notified that the cutting speed may be increased without changing the cutting tool.

Upon completion of the navigation program NPR, the operator can improve the cutting conditions of the subject machining process in the basic machining program GPR in accordance with the message MSG (number 3) shown on the display 6 by increasing the cutting speed within the range defined by the limit value WJ. Accordingly, correction of the basic machining program GPR further corrects the machining program PRO and increases the cutting speed in the subject machining process.

Figure 6:
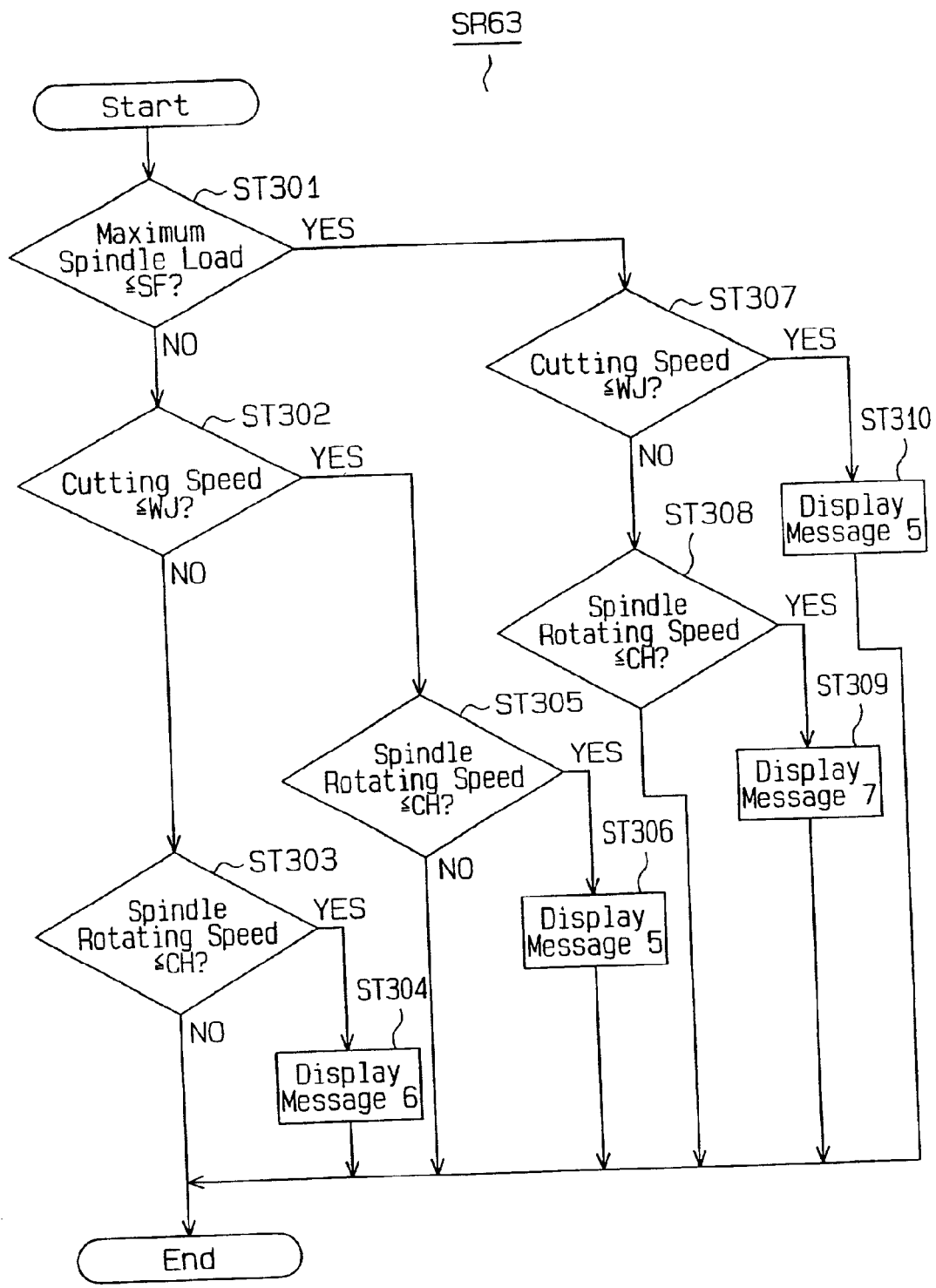
FIG. 6 is a flowchart showing the contents of a third sub-routine.

The third sub-routine SR63 illustrated in FIG. 6 will now be described in detail. As shown in FIG. 2(c), the third sub-routine SR63 is executed when the subject cutting tool is a roughing face mill. At step ST301, in the same manner as step ST201 in the flowchart of FIG. 5, the spindle load determiner 41 determines the load applied to the spindle. More specifically, the spindle load determiner 41 judges whether or not the maximum load applied to the spindle (maximum spindle load) by the cutting tool designated with the tool number stored in the subject tool number memory 29 is equal to or lower than a predetermined limit value SF (e.g., 80%). If the maximum spindle load is greater than the limit value SF, step ST302 is carried out.

At step ST302, in the same manner as step ST202 in the flowchart of FIG. 5, the cutting speed determiner 42 determines the cutting speed of the subject cutting tool. That is, the cutting speed determiner 42 refers to the values of machining variables HJ (FIG. 2(d)) to determine the cutting speed of the cutting tool designated by the number stored in the subject tool number memory 29. The cutting speed determiner 42 then judges whether or not the cutting speed is equal to or lower than the limit value WJ, which is computed by the limit value calculator 46.

The limit value calculator 46 refers to the third basic cutting speed file SYF3, which is illustrated in FIG. 11(a) and stored in the basic cutting speed file memory 43, and a third compensation coefficient file SKF3, which is illustrated in FIG. 11(b) and stored in the compensation coefficient file memory 45, to compute the cutting speed limit value WJ. The third basic cutting speed file SYF3 of FIG. 11(a) and the third compensation coefficient file SKF3 of FIG. 11(b) are used for face mills.

As shown in FIG. 11(a), the third basic cutting speed file SYF3 indicates the cutting speed limit value of the cutting tool (face mill) for different types of workpiece materials. As shown in FIG. 11(b), the third compensation coefficient file SKF3 includes a plurality of tables tf1, tf2, tf3, and so forth. Each table corresponds to one of the workpiece materials listed in the third basic cutting speed file SYF3. Each table indicates the compensation coefficient for different types of cutting tool materials. In the same manner as the first compensation coefficient file SKF1 of FIG. 9(b) and the second compensation coefficient file SKF2 of FIG. 10(b), the third compensation coefficient file SKF3 lists not only cutting tool materials but also the structure or usage of the cutting tool.

The calculator 46 refers to the basic machining program GPR stored in the machining program memory 10 to determine the material of the subject workpiece. The calculator 46 also refers to the cutting tool data file KDF in the cutting tool data memory 9 to determine the material of the cutting tool designated by the tool number stored in the subject tool number memory 29. Afterward, the calculator 46 selects the basic cutting speed that corresponds to the material of the workpiece from the third basic cutting speed file SYF3 of FIG. 11(a). The calculator 46 further selects the table corresponding to the subject workpiece material from the third compensation coefficient file SKF3 of FIG. 11(b) to locate the compensation coefficient corresponding to the tool material. The calculator 46 then multiplies the selected basic cutting speed with the selected compensation coefficient to obtain the cutting speed limit value WJ of the subject cutting tool (end mill).

If the cutting speed determiner 42 determines that the cutting speed of the subject cutting tool is greater than the limit value WJ in step ST302, step ST303 is carried out. At step ST303, in the same manner as step ST203 illustrated in the flowchart of FIG. 5, the rotating speed determiner 50 determines the spindle rotating speed. More specifically, the rotating speed determiner 50 judges whether or not the spindle rotating speed of the cutting tool designated by the tool number stored in the subject tool number memory 29 is equal to or lower than a predetermined base value CH.

If the spindle rotating speed is higher than the base value CH, this indicates that the spindle load cannot be increased (step ST301) and that the cutting spindle cannot be increased (step ST302). In addition, the spindle output cannot be increased. In such case, the efficiency of the subject machining process cannot be increased. Thus, the sub-routine is terminated without executing the machining navigation.

On the other hand, if it is determined that the spindle rotating speed is equal to or lower than the base value CH in step ST303, this indicates that, although the spindle load and cutting speed cannot be further increased, the maximum output of the spindle may be increased if the spindle rotating speed is increased. In such case, at step ST304, the navigation information manager 49 reads out the message MSG that corresponds to navigation information number 6 from the navigation information memory 47 and transmits the message MSG to the display controller 13. The display controller 13 then displays the received message MSG on the display 6. When step ST304 is finished, the sub-routine is terminated.

As shown in FIG. 8, the message MSG assigned with number 6 advises the operator to change the material of the cutting tool to increase the cutting speed. A change in the material of the cutting tool changes the compensation coefficient that is determined by referring to the second compensation coefficient file SKF2. Accordingly, if the cutting tool material is changed to obtain a larger compensation coefficient, the cutting speed limit value WJ is increased. This permits an increase in the spindle rotating speed and the cutting tool speed. An increase in the spindle rotating speed increases the maximum output of the spindle. In such state, the spindle load can be increased.

For example, if the subject cutting tool designated in the basic machining program GPR is a carbide face mill, and the corresponding table in the third compensation coefficient file SKF3 (FIG. 11(b)) is tf1, the compensation coefficient is 100%. In such case, when the message MSG assigned to number 6 appears on the display 6, the operator can determine that the cutting speed may be increased by changing the carbide face mill to a carbide coating face mill. If a carbide coating face mill is used, the compensation coefficient is 115%, as shown in table tf1 of the third compensation coefficient SKF3 (FIG. 10(b)).

Accordingly, upon completion of the navigation program NPR, the operator can improve the cutting conditions of the subject machining process in the basic machining program GPR by increasing the cutting speed in accordance with the number 6 message MSG shown on the display 6. Correction of the basic machining program GPR further corrects the machining program PRO such that the cutting speed limit value WJ increases. Thus, the cutting speed is increased within the extent permitted by the maximum output of the spindle.

If the cutting speed of the subject cutting tool is equal to or lower than the limit value WJ in step ST302, step ST305 is carried out. At step ST305, in the same manner as step ST303, the rotating speed determiner 50 judges whether or not the spindle rotating speed is equal to or lower than the base value CH. If the spindle rotating speed is higher than the base value CH, the spindle load cannot be increased and that the spindle output cannot be increased, although the cutting speed can. In other words, since the maximum output of the spindle cannot be increased even if the spindle rotating speed is increased, the spindle load cannot be increased. In such case, the efficiency of the subject machining process cannot be improved. Thus, the sub-routine is terminated without executing the machining navigation.

If it is determined that the spindle rotating speed is equal to or lower than the base value CH in step ST305, the spindle load cannot be decreased, but the cutting speed and the spindle output may be increased. In other words, the spindle load may be increased if the maximum output of the spindle is increased by increasing the spindle rotating speed. In such case, at step ST306, the navigation information manager 49 reads out the message MSG that corresponds to navigation information number 5 from the navigation information memory 47 and transmits the message MSG to the display controller 13. The display controller 13 then displays the received message MSG on the display 6. When step ST306 is finished, the sub-routine is terminated.

As shown in FIG. 8, the message MSG assigned to number 5 advises that the cutting speed of the subject cutting tool may be increased to the limit value WJ. Accordingly, if the message MSG (number 5) appears on the display 6, the operator is notified that the cutting speed may be increased without changing the cutting tool.

Upon completion of the navigation program NPR, the operator can improve the cutting conditions of the subject machining process in the basic machining program GPR by increasing the cutting speed within the range permitted by the limit value WJ in accordance to the message MSG (number 5) shown on the display 6. Correction of the basic machining program GPR further corrects the machining program PRO and increases the cutting speed in the subject machining process.

If it is determined that the maximum spindle load is equal to or lower than the limit value SF in step ST301, step ST307 is performed. At step ST307, the cutting speed determiner 42 determines the cutting speed of the subject cutting tool in the same manner as step ST302. If the cutting speed is higher than the limit value WJ, at step ST308, in the same manner as steps ST303 and ST305, the rotating speed determiner 50 judges whether or not the spindle rotating speed is equal to or lower than the base value CH. If the spindle rotating speed is higher than the base value CH, the spindle load can be increased, but the cutting speed and the spindle output cannot. In this case, efficiency of the subject machining process cannot be improved. Thus, the sub-routine is terminated without executing the machining navigation.

On the other hand, if the spindle rotating speed is equal to or lower than the base value CH in step ST308, the spindle load and the spindle output can be increased, but the cutting speed cannot. In this case, at step ST309, the navigation information manager 49 reads out the message MSG that corresponds to navigation information number 7 from the navigation information memory 47 and transmits the message MSG to the display controller 13. The display controller 13 then displays the received message MSG on the display 6. When step ST309 is finished, the sub-routine is terminated.

As shown in FIG. 8, the message MSG designated by number 7 advises using a face mill with a smaller diameter so that the spindle rotating speed can be increased. The employment of a face mill with a smaller diameter increases the spindle rotating speed without increasing the cutting speed. If the spindle rotating speed increases, the maximum output of the spindle increases. This allows an increase in the spindle load.

Accordingly, upon completion of the navigation program NPR, the operator can improve the cutting conditions of the subject machining process in the basic machining program GPR by using a face mill with a smaller diameter such that the spindle rotating speed reaches the base value CH in accordance to the message MSG (number 7) shown on the display 6. Correction of the basic machining program GPR further corrects the machining program PRO and increases spindle rotating speed without increasing the cutting speed in the subject machining process. Thus, high speed and efficient machining is performed.

If the cutting speed of the subject cutting tool is equal to or lower than the limit value WJ in step ST307, the spindle load and the cutting speed can both be increased. In this case, at step ST310, in the same manner as step ST306, the navigation information manager 49 reads out the message MSG that corresponds to navigation information number 5 from the navigation information memory 47 and transmits the message MSG to the display controller 13. The display controller 13 then displays the received message MSG on the display 6. When step ST310 is finished, the sub-routine is terminated.

As shown in FIG. 8, the message MSG designated as number 5 advises that the cutting speed of the subject cutting tool may be increased to the limit value WJ. Accordingly, if the message MSG (number 5) appears on the display 6, the operator is notified that the cutting speed may be increased without changing the cutting tool.

Upon completion of the navigation program NPR, the operator can improve the cutting conditions of the subject machining process in the basic machining program GPR by increasing the cutting speed within the range permitted by the limit value WJ in accordance to the message MSG (number 5) shown on the display 6. Correction of the basic machining program GPR further corrects the machining program PRO and increases the cutting speed in the subject machining process. Thus, high speed and efficient machining is performed.

A fourth sub-routine SR64 will now be described with reference to FIG. 7. As shown in FIG. 2(c), the fourth sub-routine SR64 is executed when the subject cutting tool is an end mill or a face mill that are used for finish machining. At step ST401, the cutting speed determiner 42 determines the cutting speed of the subject cutting tool. That is, the cutting speed determiner 42 refers to the values of machining variables HJ (FIG. 2(d)) to determine the cutting speed of the cutting tool designated by the number stored in the subject tool number memory 29. The cutting speed determiner 42 then judges whether or not the cutting speed of the subject cutting tool is equal to or lower than the limit value WJ, which is computed by the limit value calculator 46.

When the cutting tool is a finishing end mill, the limit value calculator 46 refers to the second basic cutting speed file SYF2 of FIG. 10(a) and the second compensation coefficient file SKF2 of FIG. 10(b) to compute the limit value WJ. Since the computation using the files SYF3, SKF3 is the same as that performed in step ST202 of the second sub-routine SR62, the computation will not be described here.

If the cutting speed of the finishing end mill is higher than the limit value WJ, that is, if the cutting speed cannot be increased, at step ST402, the navigation information manager 49 reads out the message MSG that corresponds to navigation information number 9 from the navigation information memory 47 and transmits the message MSG to the display controller 13. The display controller 13 then displays the received message MSG on the display 6. When step ST402 is finished, the sub-routine is terminated.

As shown in FIG. 8, the message MSG assigned to number 9 advises to change the material of the cutting tool such that the cutting speed may be increased, and to use a cutting tool that has a larger number of teeth such that the cutting feed rate may be increased. In other words, high speed machining can be performed by changing the material of the end mill to one having a higher cutting speed limit value WJ to increase the cutting speed and by using an end mill having a larger number of teeth to increase the feed rate.

Upon completion of the navigation program NPR, the operator can improve the cutting conditions of the subject machining process in the basic machining program GPR in accordance with the message MSG (number 9) shown on the display 6 by changing the material of the end mill to increase the cutting speed and by using an end mill having a larger number of teeth to increase the feed rate. Correction of the basic machining program GPR further corrects the machining program PRO and increases the cutting speed and the feed rate in the subject machining process. Thus, high speed and efficient machining is performed.

When the cutting tool is a finishing face mill, the limit value calculator 46 refers to the third basic cutting speed file SYF3 of FIG. 11(*a*) and the third compensation coefficient file SKF3 of FIG. 11(*b*) to compute the limit value WJ. Since the computation using the files SYF3, SKF3 is the same as that performed in step ST302 of the third sub-routine SR63, the computation will not be described here.

If the cutting speed of the finishing face mill is higher than the limit value WJ, that is, if the cutting speed cannot be increased, at step ST402, the navigation information manager 49 reads out the message MSG that corresponds to navigation information number 10 from the navigation information memory 47 and transmits the message MSG to the display controller 13. The display controller 13 then displays the received message MSG on the display 6.

As shown in FIG. 8, like the number 9 message MSG, the message MSG assigned to number 10 advises changing the material of the cutting tool such that the cutting speed may be increased and to use a cutting tool that has a larger number of teeth such that the cutting feed rate may be increased. Accordingly, upon completion of the navigation program NPR, the operator can improve the cutting conditions of the subject machining process in the basic machining program GPR in accordance with the message MSG (number 10) shown on the display 6 by changing the material of the face mill to increase the cutting speed and by using a face mill having a larger number of teeth to increase the feed rate. Correction of the basic machining program GPR further corrects the machining program PRO and increases the cutting speed and the feed rate in the subject machining process. Thus, high speed and efficient machining is performed.

If it is determined that the cutting speed of the end mill or face mill is equal to or lower than the limit value WJ in step ST401, that is, if the cutting speed can be increased, step ST403 is carried out. At step ST403, the navigation information manager 49 reads out the message MSG that corresponds to navigation information number 8 from the navigation information memory 47 and transmits the message MSG to the display controller 13. The display controller 13 then displays the received message MSG on the display 6. When step ST403 is finished, the sub-routine is terminated.

As shown in FIG. 8, the message MSG assigned to number 8 indicates that the cutting speed of the cutting tool may be increased to the limit value WJ. Therefore, if the message MSG (number 8) appears on the display 6, the operator is notified that the cutting speed may be increased without changing the cutting tool.

Upon completion of the navigation program NPR, the operator can improve the cutting conditions of the subject machining process in the basic machining program GPR in accordance with the message MSG (number 8) shown on the display 6 by increasing the cutting speed within the range permitted by the limit value WJ. Accordingly, correction of the basic machining program GPR further corrects the machining program PRO and increases the cutting speed in the subject machining process. Thus, high speed and efficient machining is performed.

As described above, after the basic machining program GPR is made, the operator designates a machining process which machining efficiency should be improved. The machining navigation apparatus 2 then advises the operator on how the subject machining process should be improved by displaying navigation information, which are illustrated in FIG. 8, on the display 6. Accordingly, if the operator follows the advice given by the navigation information and improves the cutting conditions of the subject machining process in the basic machining program GPR accordingly, the operator can easily make the final machining program PRO without special knowledge or experience. The actual machining is performed in accordance with the final machining program PRO, which is stored in the machining program memory 10.

The final machining program PRO is improved so that machining is performed at the highest speed allowed by the capacity of the spindle motor and the cutting tool. Therefore, high speed and efficient machining is performed by using the machining program PRO in comparison to when using the uncorrected basic machining program GPR.

Furthermore, the machining navigation apparatus 2 facilitates the correction of machining programs made for conventional machining tools to adapt to new machining tools having increased spindle capacities or using new types of tools. Therefore, machining programs are always adapted to updated machining tools by the machining navigation apparatus 2. Since the outdating of programs is avoided, software is used continuously and efficiently.

Machining navigation is performed only on the machining processes selected from the machining program. In other words, the machining navigation is performed only on machining processes which machining efficiency the operator wishes to improve. This avoids unnecessary processing and saves time.

The machining navigation can be performed in accordance with the values of machining variables HJ, which is obtained by executing the machining simulation. Accordingly, since actual machining of the workpiece need not be performed to execute the machining navigation, time is saved.

In the above embodiment, the machining navigation is performed once on the subject machining process. However, the machining navigation may be performed twice in the same machining process. For example, when completing correction of the machining program after executing the navigation program NPR, which is illustrated in FIG. 3, the machining simulation may be performed again. Afterward, the navigation program NPR may be re-executed to further improve the machining program. If necessary, such processing may be carried out repetitively to further improve the machining program.

In the flowchart of FIG. 3, the navigation is performed on a number of machining processes before it stops. However, the machining processes may be designated one at a time so that the machining navigation is executed once for each process. More specifically, the operator refers to the machining time data SJ of FIG. 2(a) that appears on the display 6 to select a single machining process on which the operator wishes to execute the machining navigation. The operator then designates the number of the cutting tool used in the selected machining process with the keyboard 5. The subject tool determiner 27 then refers to the tool data file KDF, which is stored in the tool data memory 9, to determine the type of the tool with the designated number. The sub-routine number selector 21 then refers to the sub-routine number table VTB, which is illustrated in FIG. 2(c), to select the number of the sub-routine corresponding to the tool type.

Execution of the sub-routine results in the display of navigation information, which is related to the machining process. The operator then changes the cutting conditions of the subject machining process in accordance with the information on the display 6. Afterward, the operator selects another machining process that should undergo the machining navigation and designates the number of the cutting tool used in that process with the keyboard. In the same manner as described above, the selected machining process undergoes the machining navigation and the operator then improves the machining program. This is repeated to perform machining navigation on a number of machining processes to improve the machining program. If necessary, the machining navigation may be executed for the same process repeatedly to correct the machining program more than once to further improve the machining program.

The machining navigation apparatus 2 according to the present invention is employed to aid the composition of a machining program PRO in a machining center 1. However, the present invention may also be applied to other types of machine tools, such as a lathe, an electric discharge machine, and a laser cutting machine to aid the composition of a machining program. In such cases, the contents and values of the machining variables HJ (e.g., maximum spindle load, the cutting speed of the cutting tool, and the spindle rotating speed) are changed in accordance with the type of machine. For example, the values of machining variables HJ may include the spindle rotating speed and the spindle load in lathes, the distance between electrodes and the voltage load in electric discharge machines, and the voltage load in laser cutting machines. Furthermore, the parameters mentioned above may be judged with respect to a referenced spindle load limit value in lathes and a voltage load limit value in electric discharge machines and laser cutting machines. The contents of the navigation information that appears on the display may also be changed in accordance with the machine.

The machining navigation apparatus 2 is incorporated in the control unit 100 of the machining center 1. However, the machining navigation apparatus may be an apparatus that is independent from the machining center 1 or the control unit 100.

Furthermore, the machining simulation may be executed by an apparatus separate from the machining navigation apparatus. In this case, among the simulation result information KJ, only the values of machining variables HJ of the machining processes, the cutting conditions of which should be corrected, is transmitted to the machining navigation apparatus to execute machining navigation on those processes. Accordingly, the machining navigation apparatus need not store machining programs GPR. Thus, the machining program memory 10 is not necessary. Additionally, instead of executing the machining simulation, a workpiece may actually be machined to perform the machining navigation using the data obtained during the actual machining.

When the messages MSG of FIG. 8 appear on the display 6, the message MSG explains, for example, that the cutting speed may be increased to the limit value. In this case, however, the message MSG may explain that the cutting speed may be increased to a specific value, which corresponds to the limit value. For example, the message MSG may explain that the cutting speed may be increased to (value)m/min. Furthermore, specific examples showing how to perform high speed machining may be shown on the display 6. For example, the type of cutting tool may be shown together on the display 6 with the cutting conditions, such as the cutting speed and the feed rate.

Figure 12:
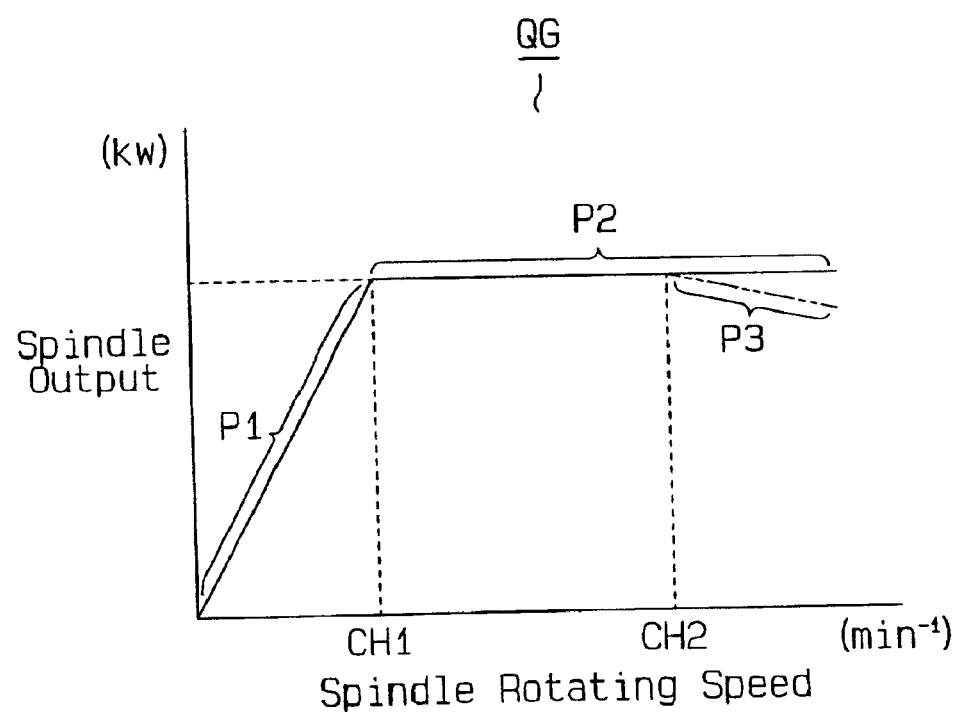
FIG. 12 is a graph showing the output characteristics of the spindle relative to the rotating speed.

In the illustrated embodiment, the parameters used to judge the machining efficiency are the spindle load limit value SF, the cutting speed limit value WJ, and the spindle speed base value CH. However, any parameter can be used as long as the machining efficiency can be judged. For example, in addition to base value CH, the spindle rotating speed limit value may be used as a parameter related with the spindle rotating speed. More specifically, as shown in the graph of FIG. 12, the machining navigation apparatus 2 may store a characteristic data QG that shows the relationship between the spindle rotating speed and the spindle output. In this case, during execution of the machining navigation, the machining efficiency is judged from the spindle speed in accordance with the spindle characteristic data QG.

As shown in FIG. 12, if the spindle rotating speed is lower than a first base value CH1 (corresponding to the base value CH used in the illustrated embodiment), the spindle output increases as the spindle rotating speed increases. This range is denoted as P1. When the spindle rotating speed is included in range P1, the spindle rotating speed can be increased. Thus, the machining navigation apparatus 2 determines that the machining efficiency can be improved by increasing the spindle rotating speed. If the spindle rotating speed is equal to or higher than the first base value CH1, the spindle output remains fixed at a constant maximum value regardless of changes in the spindle rotating speed. This range is denoted as P2. When the spindle rotating speed is included in range P2, the spindle output cannot be increased. Thus, the machining navigation apparatus 2 determines that the machining efficiency cannot be improved by increasing the spindle rotating speed.

There are machine tools which spindle output starts to decrease after exceeding a second base value CH2, which is higher than the first base value CH1, as the spindle rotating speed increases. This range is denoted as P3. In such machine tools, the machining navigation apparatus 2 determines that the machining efficiency can be improved if the spindle rotating speed is decreased to a value lower than the second limit value CH2 (and higher than the first limit value CH1) when in range P3.

In the preferred and illustrated embodiment, the operator (or programmer) refers to the navigation information shown on the display 6 to improve the machining program. However, owing to the technical progress of peripheral equipments (i.e., tool management system, abnormality management system, sensors), machine tools may automatically improve machining programs. Furthermore, the navigation information need not be displayed on the display 6 as words and sentences. In other words, characters, diagrams, images, and voices may be used as long as advice for changing the cutting conditions may be given.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. An apparatus for aiding a machinist in preparing a programmed machine for a machining process, wherein a basic program for performing the machining process is generated based on machining information input from the machinist and tool information stored in a tool data memory, the apparatus comprising:

a computer for executing the basic program to obtain values of various machining variables;

an analyzing means for analyzing the variable values obtained during the execution of the basic program to determine the efficiency of the machining process; and a notifying means for notifying the machinist with an advisory message regarding how to improve the basic program to generate a final machining program that enables the machining process to perform at the highest speed allowed by the capacity of the machine, wherein the advisory message is selected based on the analysis performed by the analyzing means and the final machining program is generated by improving the basic program according to the advisory message.

2. The apparatus according to claim 1, wherein the analyzing means compares a value of at least one of the variables with a criterion to judge whether or not the machining efficiency can be improved, and wherein the notifying means notifies a message if the machining efficiency can be improved.

3. The apparatus according to claim 1, wherein the notifying means includes a display device for displaying a message.

4. The apparatus according to claim 1, further comprising a navigation information memory for storing a plurality of messages, wherein the notifying means selects a message from the navigation information memory in accordance with the analysis performed by the analyzing means and notifies the machinist the selected message.

5. The apparatus according to claim 1, wherein the machining process is one of a plurality of machining processes, wherein the basic program is executed to obtain the values of machining variables for the machining processes, wherein the apparatus comprises an input device for designating one of the machining processes, and wherein the analyzing means analyzes the machining variables of the designated machinng process.

6. The apparatus according to claim 1 further comprising a simulation program for simulating the execution of the basic program, wherein the analyzing means performs the analysis based on information produced by execution of the simulation program.

7. The apparatus according to claim 1, wherein the machining variables include the load applied to a spindle of the machine during a cutting operation.

8. The apparatus according to claim 1, wherein the machining variables include the cutting speed of a cutting tool attached to the machine.

9. The apparatus according to claim 1, wherein the machining variables include the rotating speed of a spindle of the machine during a cutting operation.

10. The apparatus according to claim 1, wherein the message advises the machinist to increase the cutting speed of a cutting tool.

11. The apparatus according to claim 1, wherein the message advises the machinist to change a cutting tool.

12. The apparatus according to claim 1, wherein the message advises the machinist to increase the rotating speed of a spindle of the machine.

13. An apparatus for aiding a machinist in preparing a programmed machine for a plurality of machining processes, wherein a basic program for performing the machining processes is generated based on machining information input from the machinist and tool information stored in a tool data memory, the apparatus comprising:

a computer for executing a machining simulation for simulating the machining processes according to the basic program to obtain values of various machining variables;

an input device for designating a certain machining process;

an analyzing means for analyzing the machining variables of the designated machining process to determine the machining efficiency of the designated machining process;

a navigation information memory for storing a plurality of messages that provide advice to the machinist regarding how to enable each of the machining processes to achieve the highest speed allowed by the capacity of the machine; and a display means for selecting a message from the navigation information memory based on the analysis performed by the analyzing means and displaying the selected message so that a final machining program is generated by improving the basic program according to the selected message.

14. The apparatus according to claim 13, wherein the analyzing means compares a value of at least one of the variables with a criterion to judge whether or not the machining efficiency can be improved, and wherein the displaying means displays a message if the machining efficiency can be improved.

15. The apparatus according to claim 13, wherein the machining variables include the load applied to a spindle of the machine during a cutting operation.

16. The apparatus according to claim 13, wherein the machining variables include the cutting speed of a cutting tool attached to the machine.

17. The apparatus according to claim 13, wherein the machining variables include the rotating speed of a spindle of the machine during a cutting operation.

18. The apparatus according to claim 13, wherein the message advises the machinist to increase the cutting speed of a cutting tool.

19. The apparatus according to claim 13, wherein the message advises the machinist to change a cutting tool.

20. The apparatus according to claim 13, wherein the message advises the machinist to increase the rotating speed, of a spindle of the machine.

21. A method for aiding a machinist in preparing a programmed machine for a machining process, wherein a basic program for performing the machining processes is generated based on machining information input from the machinist and tool information stored in a tool data memory, the method comprising:

executing the basic program to obtain values of various machining variables;

analyzing the current values of the machining variables obtained during the execution of the basic program to determine the efficiency of the machining process; and notifying the machinist an advisory message regarding how to improve the basic program to generate a final machining program that enables the machining process to perform at the highest speed allowed by the capacity of the machine based on the analysis performed by the analyzing so that the final machining program is generated by improving the basic program according to the advisory message.

* * * * *